(12) United States Patent
Shah

(10) Patent No.: US 12,025,107 B1
(45) Date of Patent: Jul. 2, 2024

(54) POWER GENERATION SYSTEM AND METHOD

(71) Applicant: Syed Shah, Leduc (CA)

(72) Inventor: Syed Shah, Leduc (CA)

( * ) Notice: Subject to any disclaimer, the term of this patent is extended or adjusted under 35 U.S.C. 154(b) by 0 days.

(21) Appl. No.: 18/496,853

(22) Filed: Oct. 28, 2023

(51) Int. Cl.
*F03G 3/00* (2006.01)
*F03G 7/10* (2006.01)

(52) U.S. Cl.
CPC .............. *F03G 3/094* (2021.08); *F03G 3/097* (2021.08); *F03G 7/115* (2021.08); *F05B 2220/70646* (2013.01)

(58) Field of Classification Search
CPC .......... F03G 3/094; F03G 3/097; F03G 7/115; F05B 2220/70646
See application file for complete search history.

(56) References Cited

FOREIGN PATENT DOCUMENTS

| FR | 3079885 A1 | * | 10/2019 | ............... F03G 3/06 |
| WO | WO-2020071533 A1 | * | 4/2020 | ............... F03G 7/115 |
| WO | WO-2021260045 A1 | * | 12/2021 | ............... F03G 3/08 |

* cited by examiner

*Primary Examiner* — Joseph Ortega
(74) *Attorney, Agent, or Firm* — Alexander Postnikov

(57) ABSTRACT

A system to generate power, the system comprising a shaft configured for one-directional rotation around a horizontal axis, an inertial object coupled to the shaft where the inertial object has an uneven distribution of mass around the shaft, an electric generator configured to extract rotational kinetic energy from the shaft, and an electric motor configured to provide restorative energy to the shaft. The power generation method comprises steps of providing a power generation system, placing the shaft in an initial position, and inducing shaft rotation. Once shaft rotation is induced, the method alternates between steps of power generation and power consumption. More power is generated than consumed, resulting in a surplus of power supplied to the grid.

20 Claims, 12 Drawing Sheets

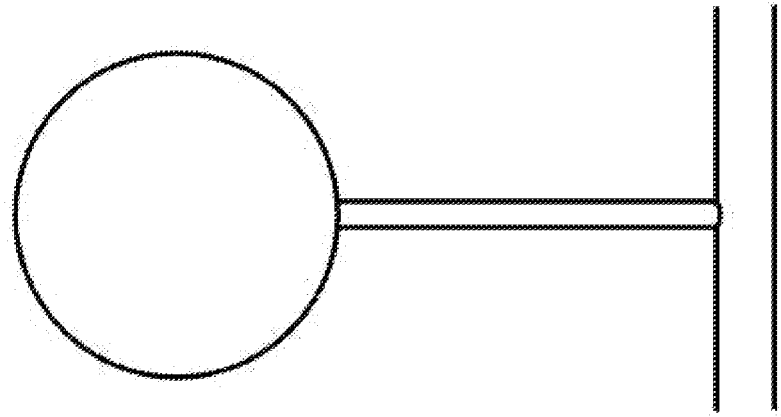
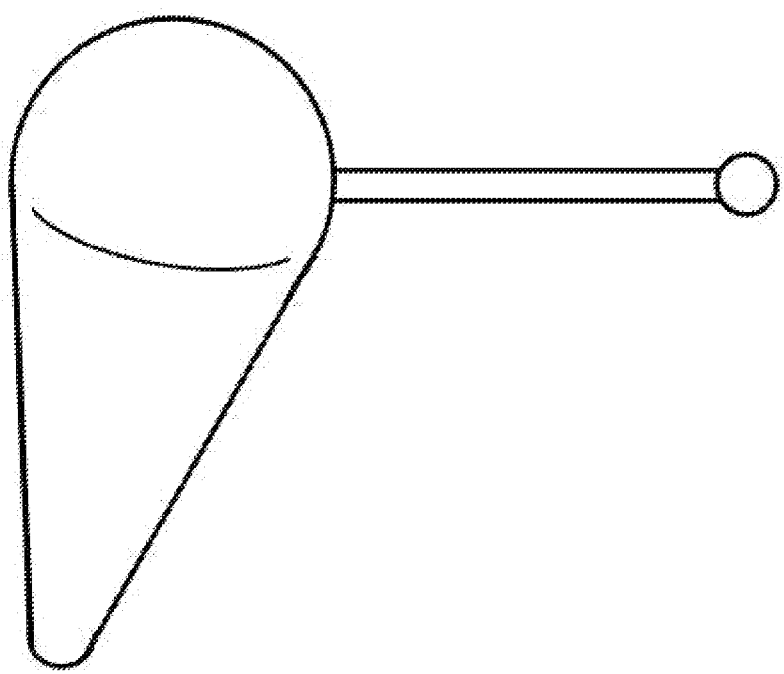
FIG. 3a

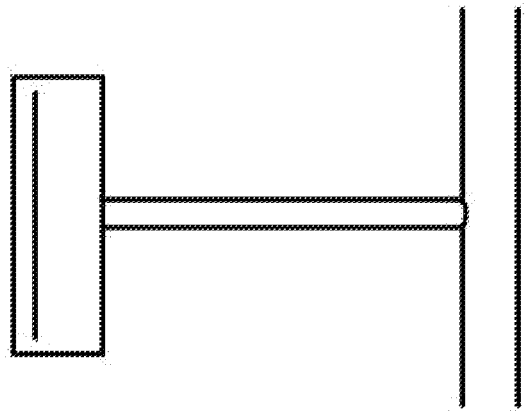
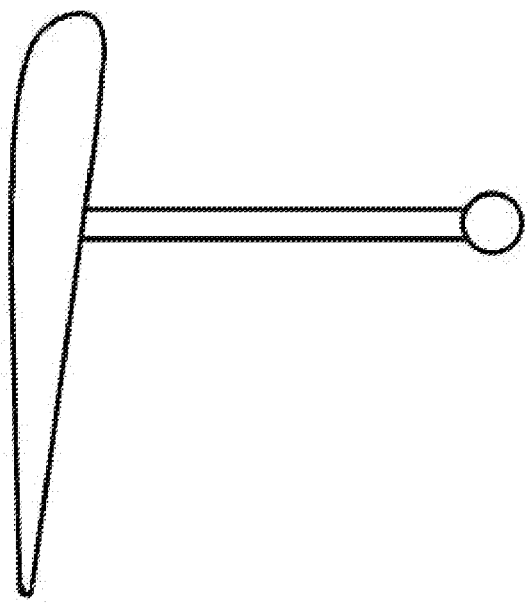
FIG. 3b

400

```
┌─────────────────────────────────────┐
│  Providing a power generation system │
│                                      │
│                 402                  │
└─────────────────────────────────────┘
                  │
                  ▼
┌─────────────────────────────────────┐
│ Placing the IO-shaft assembly in an  │
│          initial position            │
│                 404                  │
└─────────────────────────────────────┘
                  │
                  ▼
┌─────────────────────────────────────┐
│    Inducing IO-shaft assembly        │
│             rotation                 │
│                 406                  │
└─────────────────────────────────────┘
                  │
                  ▼
┌─────────────────────────────────────┐
│    Extracting rotational kinetic     │
│               energy                 │◄──┐
│                 408                  │   │
└─────────────────────────────────────┘   │
                  │                        │
                  ▼                        │
┌─────────────────────────────────────┐   │
│     Providing restorative energy     │   │
│                                      │───┘
│                 410                  │
└─────────────────────────────────────┘
```

FIG. 4

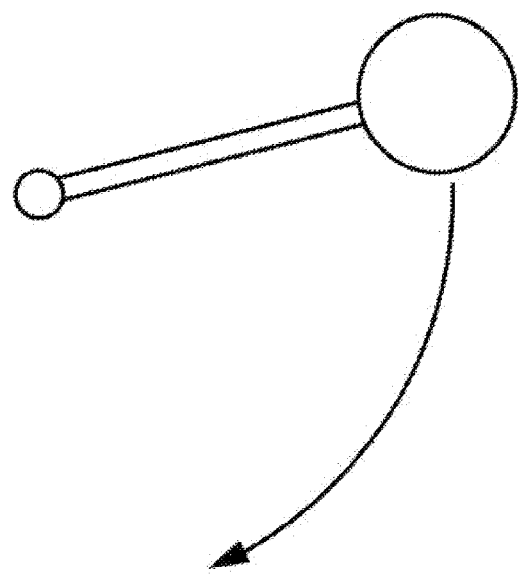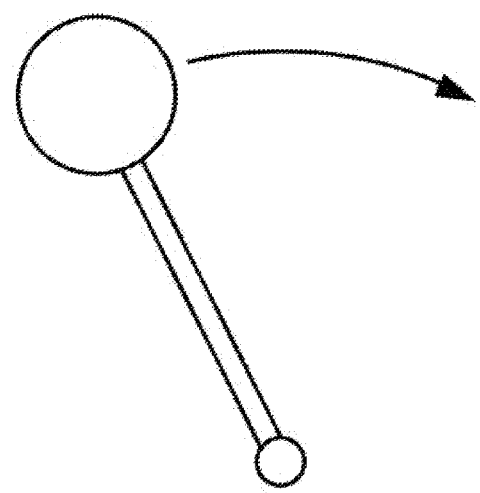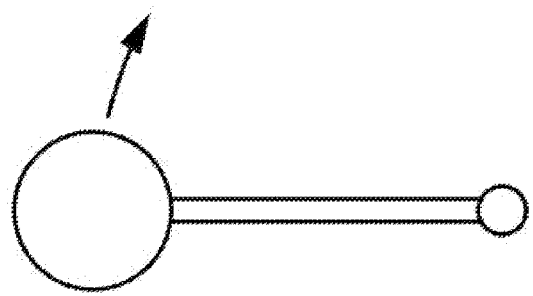
FIG. 5c

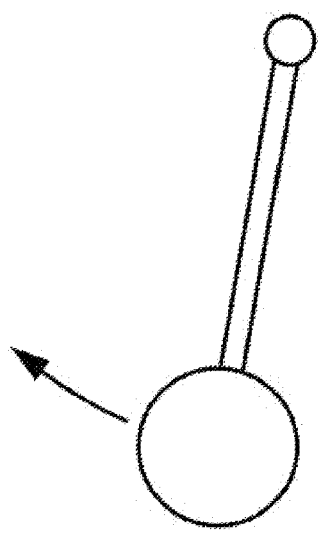
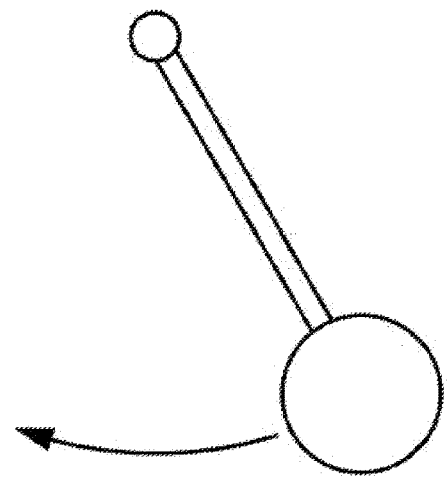
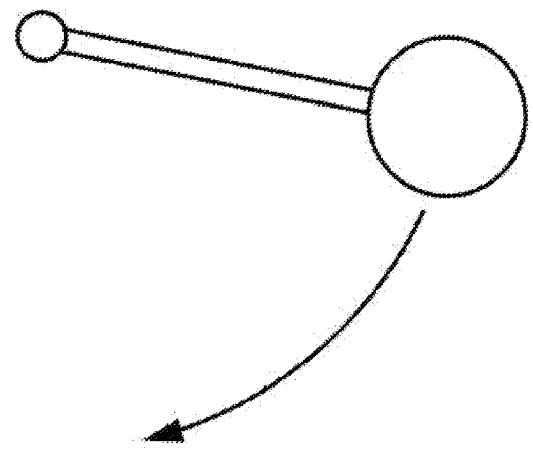
FIG. 5d

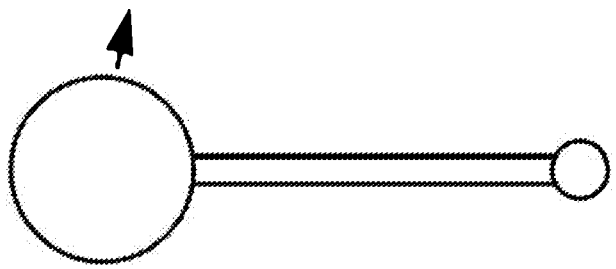
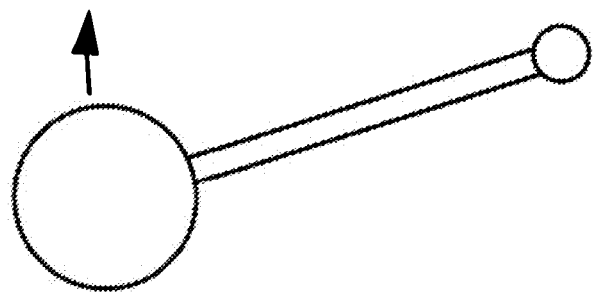
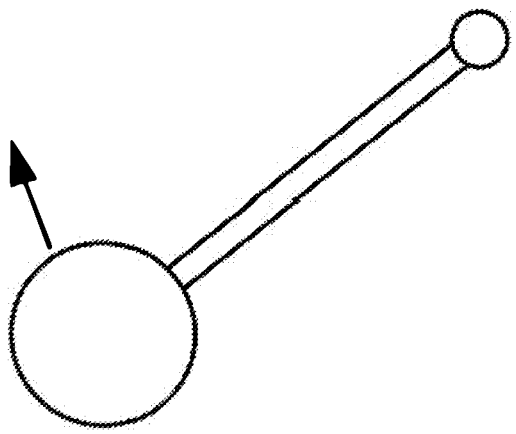
FIG. 5e

POWER GENERATION SYSTEM AND METHOD

BACKGROUND

Field of the Invention

The present invention relates generally to power generation, and, in particular, to a power generation system configured to extract energy from a gravitational field.

Scope of the Prior Art

The gravitational potential energy of an object is determined by the mass of an object and its position relative to a gravitational source. Essentially, the more massive and further away the object is from the gravitational source, the more gravitational potential energy it possesses. As demonstrated in the prior art, the potential gravitational energy of a rotating inertial object can be converted into rotational kinetic energy, and, ultimately, into electricity. However, traditional systems operating on this principle have been ineffective due to a number of flaws.

First, traditional systems often add energy to the rotating inertial object during its freefall phase. Although this step induces faster rotation of the inertial object, it reduces its time spent being actively accelerated by gravity, and, as a result, reduces the amount of gravitational potential energy converted into electricity rotation. In contrast, the rotational inertial object of the instant invention rotates uninterrupted during its freefall phase, resulting in more gravitational potential energy converted into electricity per rotation.

Second, the electricity generated by traditional systems often goes through an internal storage device or a transformer before reaching the grid. Such intermediate steps increase transmission losses, especially over long distances. In contrast, the instant invention can be incorporated directly into the grid, making it more efficient and versatile than traditional systems.

SUMMARY

The present disclosure satisfies the foregoing needs by providing, inter alia, a power generation system for addressing each of the foregoing desirable traits as well as its method of its use.

One aspect of the present invention is directed at a system to generate power, the system comprising a shaft configured for one-directional rotation around a horizontal axis, an inertial object coupled to the shaft where the inertial object has an uneven distribution of mass around the shaft, an electric generator coupled to a first end of the shaft where the electric generator is configured to extract rotational kinetic energy from the shaft, and an electric motor coupled to a second end of the shaft where the electric motor is configured to provide restorative energy to the shaft Another aspect of the present invention is directed at a method of power generation, the method comprising providing a power generation system, placing the shaft in an initial position where a center of mass of the inertial object is directly above an axis of rotation of the shaft and inducing shaft rotation. Once shaft rotation is induced, the method continuously alternates between steps of power generation and power consumption. More power is generated than consumed, resulting in a surplus of power supplied to the grid.

The gravitational potential energy of the inertial object is added to the shaft during a first period of rotation in which the shaft rotates from the initial position to the halfway position. During this period, the gravitational potential energy is converted into rotational kinetic energy.

The rotational kinetic energy of the shaft is maximum at the intermediate position due to the gravitational inertial energy, resulting in rotational motion of the shaft from initial position to beyond the intermediate position. The rotational kinetic energy of the shaft is extracted from the shaft during the entire rotational movement of the shaft from initial position to a final position beyond the intermediate position.

The restorative energy is provided to the shaft during a third period of rotation in which the shaft rotates from the intermediate position to the final position.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where:

FIGS. 3a-3e show exemplary inertial object shapes, according to various embodiments.

FIG. 4 is a flowchart showing steps of a power generation method, according to an embodiment.

FIGS. 5a-5e show the power generation method of FIG. 4, as applied to the power generation system of FIG. 1, according to an embodiment.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations. Wherever convenient, the same reference numbers will be used throughout the drawings to refer to same or like parts.

Moreover, while variations described herein are primarily discussed in the context of a power generation system configured to extract energy from a gravitational field, it will be recognized by those of ordinary skill that the present disclosure is not so limited. In fact, the principles of the present disclosure described herein may be readily applied to power generation systems in general.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

Figure 1:
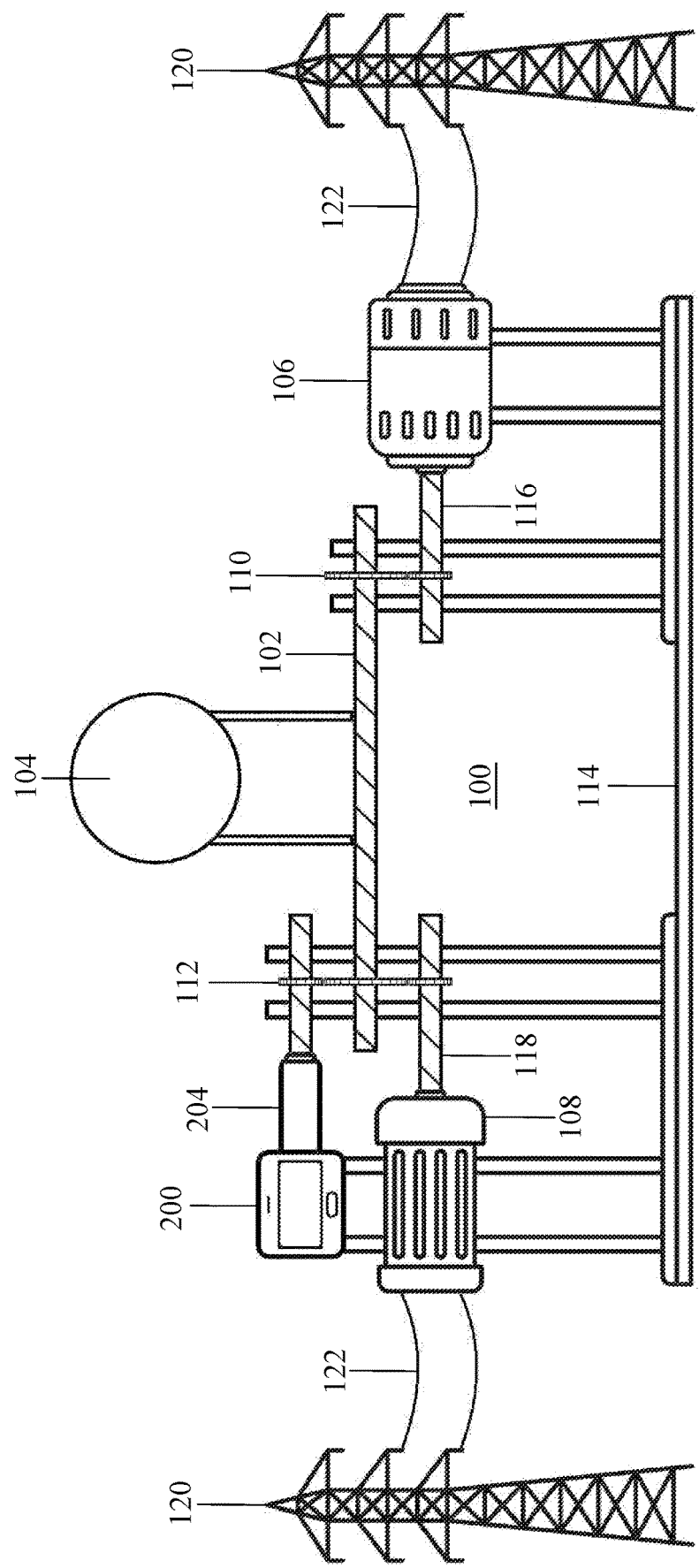
FIG. 1 is a cross-sectional view of a power generation system, according to an embodiment.

FIG. 1 is a cross-sectional view of a power generation system 100, according to an embodiment. The power generation system 100 comprises a main shaft 102, an inertial object 104, an electric generator 106, an electric motor 108, a first transmission 110, and a second transmission 112.

The main shaft 102 is movably held in a rotatable state such that an axis of rotation of the main shaft 102 is perpendicular to the pull of gravity. Energy loss during main shaft 102 rotation is minimized using any of the following methods or a combination thereof:

Reduced rotation friction from:
the use of ball bearings or other rolling-element bearings to separate the main shaft 102
from the base 114.
the lubrication of shaft-base contact areas.
Reduced aerodynamic drag from:
the use of thin shaft diameters.
the enclosure of the main shaft 102 and the inertial object 104 within a vacuum or near-vacuum.

The main shaft 102 is constructed out of a suitably light and rigid material, preferably titanium or carbon fiber. Alternatively, any other suitably light and rigid material may be used. A rachet mechanism may be coupled to the main shaft 102 to ensure one-directional rotation.

The inertial object 104 is coupled to the main shaft 102 via connecting rods. Alternatively, the inertial object 104 is integrated into the main shaft 102. Herein, the combination of the inertial object 104 and the main shaft 102 is referred to as the IO-shaft assembly.

The mass of the inertial object 104 is unevenly distributed around the main shaft 102 such that the center of mass of the IO-shaft assembly is offset from the axis of rotation of the main shaft 102.

The electric generator 106 extracts energy from shaft 116 rotation to generate alternating or direct current. Said current is output directly to the power grid 120 via electric wiring 122. Energy loss during shaft 116 rotation is minimized using any of the aforementioned energy loss minimization methods or a combination thereof.

Preferably, the electric generator 106 is a doubly-fed induction generator. Compared to traditional electric generators, doubly-fed induction generators can output, at variable shaft rotation speeds, voltages of a constant amplitude and frequency. The shaft 118 of the electric generator 106 rotates at variable speeds so said functionality advantageously maximizes current generation. Preferably, outputted alternating current has a frequency of 50-60 Hz.

Transmission costs represent a significant portion of the total cost of electricity usage. Such costs can be substantially reduced by eliminating the need for long distance transmission infrastructure such step up and step-down transformers. As the instant invention is directly incorporated into the grid, it does not require such costly infrastructure, allowing it to be placed at any location and reducing transmission loses. Furthermore, the instant invention can be strategically deployed along the grid as smaller sub-stations. In addition to its environmental benefits, its deployment flexibility adds to the robustness of the existing grid. It can also be implemented as a backup for the existing grid by major load junctions.

Alternatively, the electric generator 106 is a DC generator. Traditionally, direct current has not been used for large scale power grids due to having high transmission losses at long ranges, especially when compared to alternating current. However, such transmission losses can be mitigated or completely eliminated through the integration of the instant invention which generates more power than it consumes. By placing a power generation system 100 at strategic points, the direct current is periodically amplified as it travels through the grid 120.

Direct current is generally considered safer than alternating current. By mitigating long range transmission losses, the present invention improves the viability of large scale direct current grids. Such grids would advantageously provide safer power, especially in island countries such as Australia, New Zealand, and Japan.

The electric generator 106 engages the IO-shaft assembly via a first transmission 110 configured to increase the rotational speed of the electric generator shaft 116 relative to that of main shaft 102. The first transmission 100 is a gear train assembly comprising a large diameter gear on the main shaft 102 and a small diameter hear on the shaft 116 of the electric generator 106. Alternatively, the first transmission 100 is a toothed belt drive, chain, or other transmission means with similar functionality.

Preferably, the first transmission 100 has multi-speed functionality such that, for a wide range of main shaft 116 rotational speeds, the electric generator shaft 116 maintains the optimal rotational speed for current generation in the electric generator 106. This may be achieved by using, for example, a hydraulic automatic transmission.

The electric motor 108 draws alternating or direct current to induce shaft 118 rotation. Said current is drawn directly from a power grid 120 via electric wiring 122. Energy loss during shaft 118 rotation is minimized using any of the aforementioned energy loss minimization methods or a combination thereof. Preferably, the shaft 118 has a length such that its moment of inertia is considerably smaller than the moment of inertia of the rotors of the electric generator 106.

The IO-shaft assembly engages the electric motor 108 the via a second transmission 112 configured to reduce the rotational speed of the main shaft 102 relative to that of the electric motor shaft 118. The second transmission 112 is a gear train assembly comprising a large diameter gear on the main shaft 102 and a small diameter gear on the shaft 118 of the electric motor 108. Alternatively, the second transmission 112 is a toothed belt drive, chain, or other transmission means with similar functionality.

Preferably, the second transmission 112 has asymmetrical functionality such that rotating the shaft 118 of the electric motor 108 induces rotation of the main shaft 102 but rotating the main shaft 102 does not induce rotation of the shaft 118 of the electric motor. This may be achieved by using, for example, a planetary gear assembly having a gear ratchet.

Said asymmetrical functionality provides two advantages:

First, continuous motor operation is no longer required. Rather, the electric motor 108 only operates periodically to provide restorative energy to the main shaft 102. Decreasing the electric motor's duty cycle results in a reduced power draw and decreased motor wear and tear.

Second, energy loss during IO-shaft assembly rotation is reduced because the rotational kinetic energy of the IO-shaft assembly is not used to maintain the rotational speed of the electric motor shaft 118 during electric motor 108 downtime.

The power generation system 100 may further comprise a control module 200 configured to generate an output signal to control an intensity of the electric motor 116 as will be later described.

The power generation system 100 may further comprise a positional sensor 204 configured to continuously, or periodically, measure a position of the IO-shaft assembly. The instantaneous rotational speed of the IO-shaft assembly can be determined as the derivative of the measured position with respect to the time of the measurement. Alternatively, a tachometer may be used to continuously, or periodically, measure the rotational speed of the IO-shaft assembly.

The power generation system 100 does not comprise an internal power storage device. Power is drawn from the grid 120 as needed. Power is output to the grid 120 as soon as it is generated. Without an internal power storage device, the power generation system 100 is smaller and more compact than comparable traditional systems. The instant invention can be advantageously placed in areas that were previously inaccessible due to size constraints.

Larger components are typically more efficient than their smaller counterparts. Thus, increasing the size of components used within the instant invention will create a larger, more efficient system with an increased power output. Such power generation systems can be advantageously placed in areas that were previously inaccessible due to power consumption constraints. Power outputs, in order of increasing preference, are at least 10 MW, at least 100 MW, at least 1 GW, and at least 10 GW.

According to one embodiment, the power generation system 100 is placed underground or substantially underground. Such underground placements dissipate vibrations better than their above ground counterparts. Furthermore, such underground placements can advantageously preserve local aesthetics.

Figure 2:
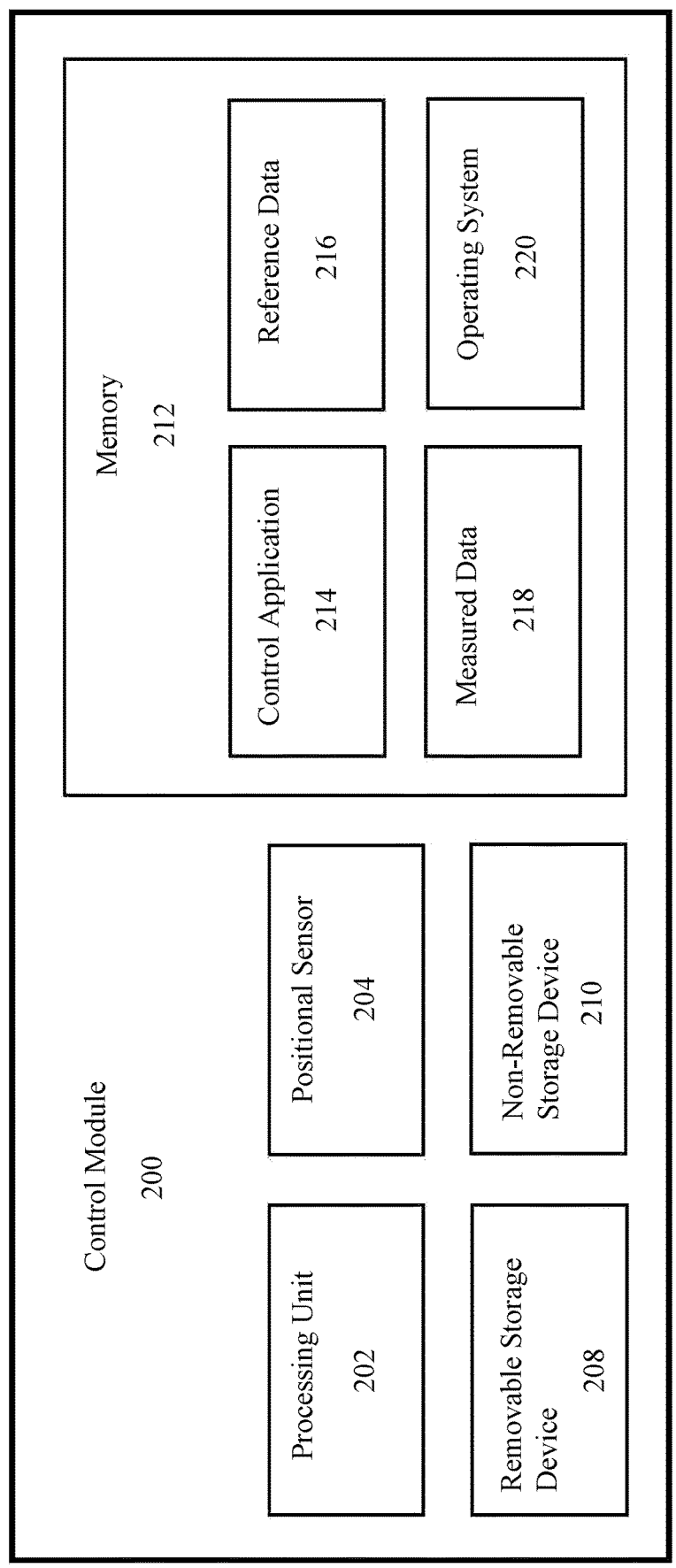
FIG. 2 is a block diagram illustrating example physical components of a control module for the power generation system.

FIG. 2 is a block diagram illustrating example physical components (e.g., hardware) of a control module 200, according to an embodiment. The control module 200 includes at least one processing unit 202 and memory 212.

The processing unit 202 executes commands to perform the functions specified in flowcharts and/or block diagram blocks throughout this disclosure. It should be appreciated that processing may be implemented either locally via the processing unit 202 or remotely via various forms of wireless or wired networking technologies or a combination of both.

The term computer readable media as used herein may include computer storage media. Computer storage media may include volatile and nonvolatile, removable and non-removable media implemented in any method or technology for storage of information, such as computer readable instructions, data structures, or program modules. The memory 212, the removable storage device 208, and the non-removable storage device 210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the control module 200. In some embodiments, such computer storage media may be part of the control module 200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Memory 212 may include various types of short and long-term memory as is known in the art. Memory 212 may be loaded with various applications in the form of computer readable program instructions. These computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry (PLC), field-programmable gate arrays (FPGA), or programmable logic arrays (PLA) may execute the computer readable program instructions by utilizing state information of the computer readable program instructions to personalize the electronic circuitry, in order to perform aspects of the present invention.

Applications include a control application 214 configured to generate an output signal to control the output response of the electric motor 116.

Preferably, the control application 214 employs proportional-integral-derivative (PID) control logic to generate the output signal based on a set of input variables, the input variables including, but not limited to, a reference rotational speed and measured rotational speed. Alternatively, the control application 214 may employ other control logic that generates a desired output through the manipulation of a set of input variables.

Reference data 216 and measured data 218 is stored in the memory 112. Measured data 218 is collected via the various instruments and sensors of the power generation system 100 and may include measurements such as, but not limited to, component positions and component rotational speeds.

Memory 212 may include an operating system 220 suitable for controlling the operation of the control module 200.

The control module 200 may include a positional sensor 204 integrated into, or otherwise coupled to, the control module 200. Here, the positional sensor 204 engages the IO-shaft assembly via the second transmission 112. Alternatively, the positional sensor 204 may engage the IO-shaft assembly via other means. The position of the inertial object 104 and the rotational speed of the main shaft 102 are continuously measured and saved to measured data 218.

FIGS. 3a-3e show exemplary shapes for the inertial object. The leading edge, the trailing edge, or both edges of the inertial object are shaped to improve the aerodynamic performance of the IO-shaft assembly. For clarity purposes, only the main shaft 102, the inertial object 104, and a connecting rod are illustrated.

FIG. 3a shows front and side views of a teardrop-shaped inertial object.

FIG. 3b shows front and side views of an airfoil-shaped inertial object.

Figure 3C:
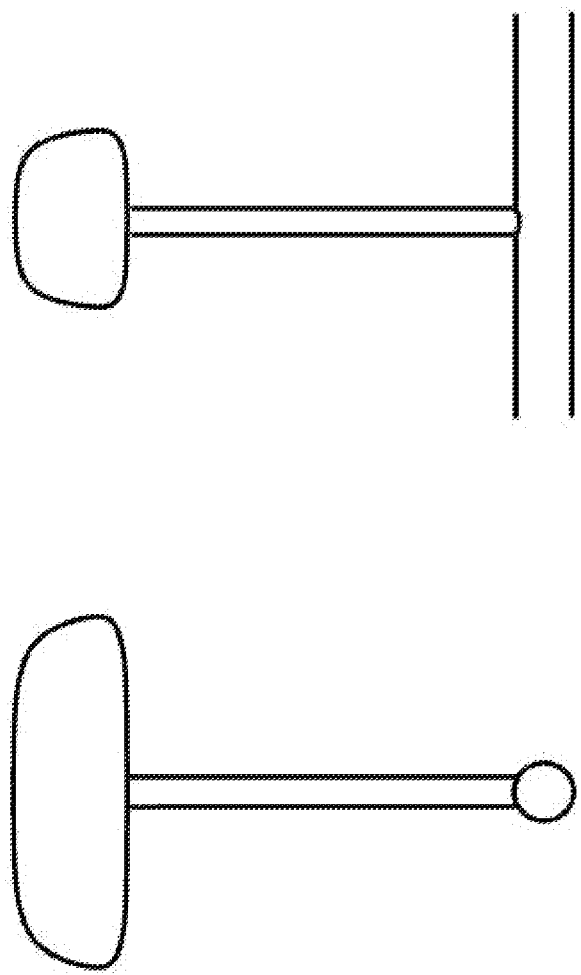

FIG. 3c shows front and side views of an ellipsoid-cylinder-shaped inertial object.

Figure 3D:
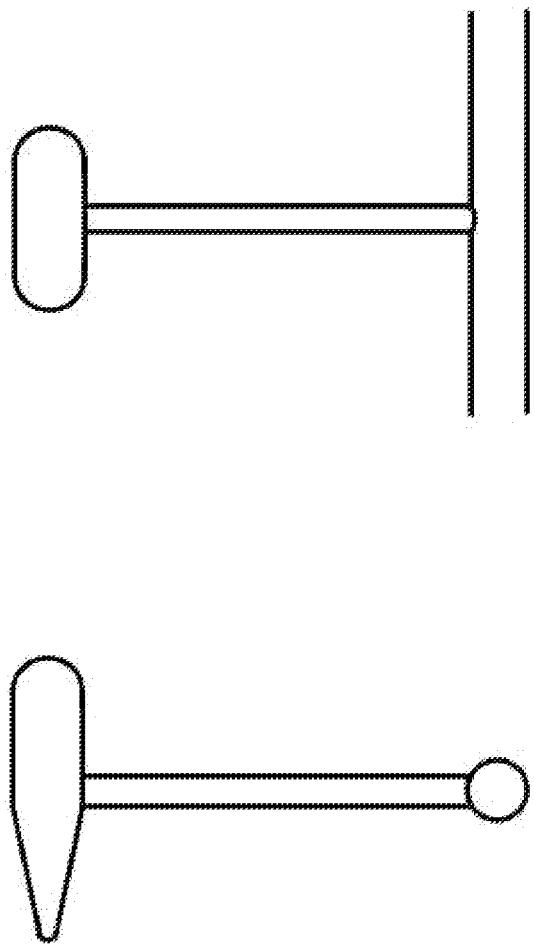

FIG. 3d shows front and side views of a tapered-spherocylindrical-shaped inertial object.

Figure 3E:
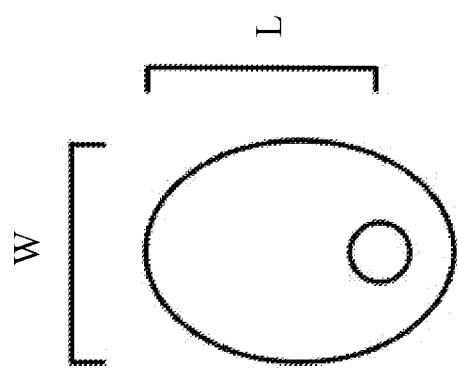

FIG. 3e shows a side view of an oval-shaped inertial object having a length L and width W. Length L is defined as the distance between the axis of rotation of the main shaft and the outermost point of the inertial object, where length L is measured perpendicular to the axis of rotation of the main shaft. Width W is defined as the distance between leftmost and rightmost points of the inertial object, where width W is measured perpendicular to length L and to the axis of rotation of the main shaft.

Reducing the length-to-width ratio of the inertial object creates a smaller, more compact power generation system 100. Such systems can be advantageously placed in areas that were previously inaccessible due to size constraints. Length-to-width ratios, in order of increasing preference, are less than 3, less than 2.5, less than 2, and less than 1.5.

Preferred embodiments further include cone-shaped and triangle-shaped inertial objects (not illustrated).

FIG. 4 is a flowchart showing steps of a power generation method 400.

The method 400 begins at step 402 in which a power generation system 100 is provided.

At step 404, the IO-shaft assembly is placed in an initial position (0 degree mark) in which the center of mass of the inertial object 104 is directly above the axis of rotation of the main shaft 102. Each revolution of the inertial object 104 around the main shaft 102 begins with the IO-shaft assembly crossing this initial position (0 degree mark). For clarity purposes, the initial position (0 degree mark) is sometimes referred to as the final position (360 degree mark).

Among all possible positions, the center of mass of the IO-shaft assembly is furthest from the source of gravity (typically the Earth) when the IO-shaft assembly is at its initial position (0 degree mark). Thus, the initial position (0 degree mark) represents a maximum in the gravitational potential energy of the IO-shaft assembly.

At step 406, rotation of the IO-shaft assembly is induced. The electric motor 108 provides a small nudge to the IO-shaft assembly. Preferably, this nudge is just strong enough to dislodge the IO-shaft assembly from its initial position (0 degree mark). The IO-shaft assembly then rotates freely under the influence of gravity during a first period of rotation in which the IO-shaft assembly rotates from the initial position (degree mark) to a halfway position (180 degree mark).

Among all possible positions, the center of mass of the IO-shaft assembly is nearest to the source of gravity (typically the Earth) when the IO-shaft assembly is at its halfway position (180 degree mark). Thus, the halfway position (180 degree mark) indicates a minimum in the gravitational potential energy of the IO-shaft assembly.

For optimal conversion of gravitational potential energy into rotational kinetic energy, the IO-shaft assembly must be allowed to free-fall for as long as possible during the first period of rotation, the resulting gravitational inertial energy is then readily converted into rotational kinetic energy. This may be achieved using the following methods, or a combination thereof:

1) controlling the rotational speed of the IO-shaft assembly such that its minimum rotational speed is reached at the initial position (0 degree mark). Preferably, the minimum rotational speed is the lowest non-zero rotational speed at which the IO-shaft assembly can rotate past the initial position (0 degree mark) without stalling at the initial position (0 degree mark).
2) not adding external energy to the IO-shaft assembly during the first period of rotation. The addition of external energy, such as via the electric motor 108, would increase the rotational speed of the IO-shaft assembly, and, thus, decrease its free-fall time. As such, the electric motor 108 should be turned off or disengaged from the IO-shaft assembly during the first period of rotation.

At step 408, rotational kinetic energy is extracted from the IO-shaft assembly. The electric generator 106 is engaged to the IO-shape assembly during a second period of rotation in which the IO-shaft assembly rotates from the initial position (0 degree mark) to an intermediate position (found within the 180-360 degree range).

Alternatively, rotational kinetic energy is extracted from the IO-shaft assembly during a modified second period of rotation in which the IO-shaft assembly rotates from its halfway position (180 degree mark) to the intermediate position (found within the 180-360 degree range). In this scenario, no rotational kinetic energy is extracted from the IO-shaft assembly during its free-fall. The extraction of rotational kinetic energy from the IO-shaft assembly during its freefall, such as via the electric generator 106, would decrease the rotational speed of the IO-shaft assembly as it enters the modified second period of rotation.

The intermediate position (found within the 180-360 degree range) is the endpoint of the second period of rotation or the modified second period of rotation. Extraction of rotational kinetic energy from the IO-shaft assembly ceases at the intermediate position.

An exact degree mark for the intermediate position (found within the 180-360 degree range) is based on operational constraints such as, but not limited to, the rate of rotational kinetic energy extraction and component efficiencies.

For example, an increased rate of rotational kinetic energy extraction during the second period of rotation would decrease how far the IO-shaft assembly can rotate before restorative energy is required to maintain rotation while a decreased rate of rotational energy extraction during the second period of rotation would increase how far the IO-shaft assembly can rotate before restorative energy is required to maintain rotation.

Likewise, decreased component efficiencies would increase frictional losses and decrease how far the IO-shaft assembly can rotate before restorative energy is required to maintain rotation while increased component efficiencies would decrease frictional losses and increase how far the IO-shaft assembly can rotate before restorative energy is required to maintain rotation.

At step 410, restorative energy is provided to the IO-shaft assembly. The electric motor 108 provides a nudge to the IO-shaft assembly during a third period of rotation in which the IO-shaft assembly rotates from the intermediate position (found within the 180-360 degree range) to the final position (360 degree mark). Preferably, this nudge is just strong enough to rotate the IO-shaft assembly past the final position (360 degree mark) without stalling at the final position (360 degree mark).

Once rotation is induced, the power generation method 400 continuously alternates between step 408, in which power is generated, and step 410, in which power is consumed. With sufficiently efficient components, more power is generated than consumed, resulting in a surplus of power supplied to the grid 120.

It is to be understood that a full revolution of the IO-shaft assembly includes 1) the first period of rotation, 2) the second period of rotation or the modified second period of rotation, and 3) the third period of rotation.

The first period of rotation includes all IO-shaft assembly positions between the initial position (0 degree mark) and the halfway position (180 degree mark).

The second period of rotation includes all IO-shaft assembly positions between the initial position (0 degree mark) and the intermediate position (found within the 180-360 degree range).

The modified period of rotation includes all IO-shaft assembly positions between the halfway position (180 degree mark) and the intermediate position (found within the 180-360 degree range).

The third period of rotation includes all IO-shaft assembly positions between the intermediate position (found within the 180-360 degree range) and the final position (360 degree mark).

In some embodiments, the first period of rotation and the second period of rotation may overlap. The second period of rotation or the modified second period of rotation immediately precede the third period of rotation which immediately precedes the first period of rotation.

Figure 5B:
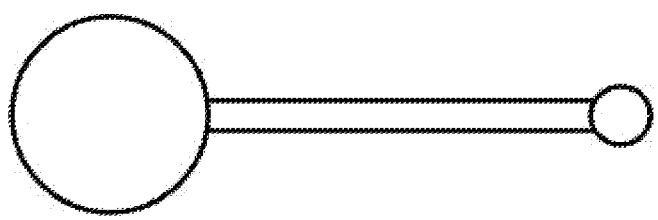
Figure 5A:
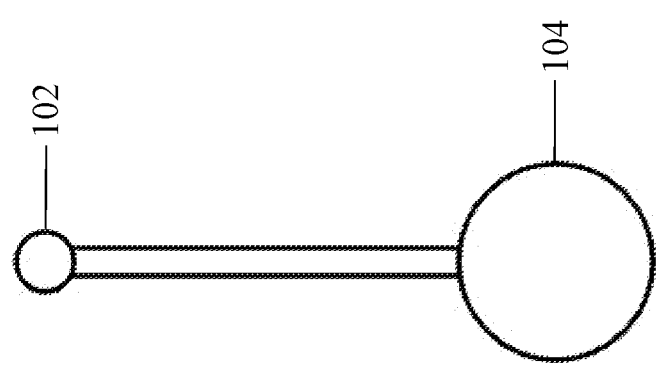

FIGS. 5a-5c show steps of the power generation method 400, as applied to the power generation system 100. For clarity purposes, only the main shaft 102, the inertial object 104, and a connecting rod are illustrated. Relative rotational speeds are indicated by arrow magnitude. In figures showing more than one position of the IO-shaft assembly, the positions are arranged in chronological order with rightmost positions occurring later in time.

FIG. 5a shows step 402 in which a power generation system 100 is provided.

FIG. 5b shows step 404 in which the IO-shaft assembly is placed in the initial position. Its gravitational potential energy is at a maximum.

FIG. 5c shows step 406 in which rotation of the IO-shaft assembly is induced. As the IO-shaft assembly rotates from the initial position (0 degree) to a maximum swing angle position (found within the 180-360 degree range), its gravitational potential energy is converted into rotational kinetic energy.

FIG. 5d shows step 408 in which the rotational kinetic energy of the IO-shaft assembly is extracted. As the IO-shaft assembly rotates from the initial position to an intermediate position, its rotational kinetic energy is converted into electric current and output to the grid 120. Extraction of rotational kinetic energy ceases before the rotational speed of the IO-shaft assembly reaches zero.

FIG. 5e shows step 410 in which restorative energy is provided to the IO-shaft assembly. Electric current is drawn from the grid 120 and used to increase the rotational speed of the IO-shaft assembly. At its final position, the rotational speed of the IO-shaft is just fast enough to avoid stalling.

Methods in this document are illustrated as blocks in a logical flow graph, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described method blocks can be combined in any order to implement the illustrated method, or alternate methods. Additionally, individual blocks may be deleted from the methods without departing from the spirit and scope of the subject matter described herein.

I claim:

1. A system to generate power comprising:
    a shaft configured for one-directional rotation around a horizontal axis;
    an inertial object coupled to the shaft, the inertial object having an uneven distribution of mass around the shaft;
    an electric generator coupled to a first end of the shaft, the electric generator configured to extract rotational kinetic energy from the shaft;
    an electric motor coupled to a second end of the shaft, the electric motor configured to provide restorative energy to the shaft;
    wherein
    a center of mass of the inertial object is positioned directly above an axis of rotation of the shaft in an initial position of the shaft;
    gravitational potential energy of the falling inertial object is added to the shaft during a first period of rotation in which the shaft rotates from the initial position to 180 degrees past the initial position;
    the rotational kinetic energy of the shaft is extracted from the shaft during a second period of rotation in which the shaft rotates from the initial position to an intermediate position that is 180-360 degrees past the initial position; and
    the restorative energy is provided to the shaft during a third period of rotation in which the shaft rotates from the intermediate position to a final position that is 360 degrees past the initial position;
    after shaft rotation is induced, the shaft rotates continuously without stalling.

2. The system of claim 1, wherein the electric generator outputs, at variable shaft rotation speeds, voltages of a constant amplitude and frequency.

3. The system of claim 2, wherein the electric generator is a doubly-fed induction generator.

4. The system of claim 2, wherein
    the electric generator outputs power directly to an external power grid;
    the electric motor draws power directly from the external power grid; and
    the system does not comprise an internal power storage device.

5. The system of claim 4, wherein the electric generator outputs at least 10 megawatts of power to the external power grid.

6. The system of claim 4, wherein at least 21.5% of the rotational kinetic energy extracted from the shaft is output into the external power grid.

7. The system of claim 4, wherein a length-to-width ratio of the inertial object is less than 2, the length taken along a first line extending outwards perpendicular from the axis of rotation of the shaft, and the width taken along a second line perpendicular to the first line and perpendicular to the axis of rotation of the shaft.

8. The system of claim 7, wherein at least one of a leading edge and a trailing edge of the inertial object is contoured for improved aerodynamic performance.

9. The system of claim 4, wherein the power generation system is positioned one of underground and substantially underground.

10. The system of claim 4, wherein, after shaft rotation is induced, a minimum rotation speed of the shaft occurs at the initial position of the shaft.

11. A method of generating power comprising:
providing a system comprising:
a shaft configured for one-directional rotation around a horizontal axis;
an inertial object coupled to the shaft, the inertial object having an uneven distribution of mass around the shaft;
an electric generator coupled to a first end of the shaft, the electric generator configured to extract rotational kinetic energy from the shaft;
an electric motor coupled to a second end of the shaft, the electric motor configured to provide restorative energy to the shaft;
placing the shaft in an initial position in which a center of mass of the inertial object is directly above an axis of rotation of the shaft;
inducing shaft rotation, wherein
gravitational potential energy of the falling inertial object is added to the shaft during a first period of rotation in which the shaft rotates from the initial position to 180 degrees past the initial position;
the rotational kinetic energy of the shaft is extracted from the shaft during a second period of rotation in which the shaft rotates from the initial position to an intermediate position that is 180-360 degrees past the initial position; and the restorative energy is provided to the shaft during a third period of rotation in which the shaft rotates from the intermediate position to a final position that is 360 degrees past the initial position.

12. The method of claim 11, wherein the electric generator outputs, at variable shaft rotation speeds, voltages of a constant amplitude and frequency.

13. The method of claim 12, wherein the electric generator is a doubly-fed induction generator.

14. The method of claim 12, wherein
the electric generator outputs power directly to an external power grid;
the electric motor draws power directly from the external power grid;
the system does not comprise an internal power storage device.

15. The method of claim 14, wherein the electric generator outputs at least 10 megawatts of power to the external power grid.

16. The method of claim 14, wherein at least 21.5% of the rotational kinetic energy extracted from the shaft is output into the external power grid.

17. The method of claim 14, wherein a length-to-width ratio of the inertial object is less than 2, the length taken along a first line extending perpendicular from the axis of rotation of the shaft, and the width taken along a second line perpendicular to the first line and the axis of rotation of the shaft.

18. The method of claim 17, wherein at least one of a leading edge and a trailing edge of the inertial object is contoured for improved aerodynamic performance.

19. The method of claim 14, wherein the power generation system is positioned one of underground and substantially underground.

20. The system of claim 14, wherein, after shaft rotation is induced, a minimum rotation speed of the shaft occurs at the initial position of the shaft.

* * * * *